United States Patent
Nelson et al.

(10) Patent No.: US 8,919,789 B2
(45) Date of Patent: Dec. 30, 2014

(54) HARVESTER WITH SUSPENDED REAR AXLE

(71) Applicant: AGCO Corporation, Duluth, GA (US)

(72) Inventors: Darren J. Nelson, Hutchinson, KS (US); Nicholas H Williams, Hesston, KS (US); Mark L. Cozine, Valley Center, KS (US)

(73) Assignee: AGCO Corporation, Duluth, GA (US)

( * ) Notice: Subject to any disclaimer, the term of this patent is extended or adjusted under 35 U.S.C. 154(b) by 76 days.

(21) Appl. No.: 13/832,176

(22) Filed: Mar. 15, 2013

(65) Prior Publication Data

US 2014/0260152 A1    Sep. 18, 2014

(51) Int. Cl.
*B60G 9/00* (2006.01)
*A01D 41/12* (2006.01)

(52) U.S. Cl.
CPC ..................................... *A01D 41/12* (2013.01)
USPC ............. 280/6.156; 280/6.154; 280/124.116; 280/124.157

(58) Field of Classification Search
CPC .... B60G 9/00; B60G 9/003; B60G 2200/314; B60G 2300/08; B60G 2300/082; B60G 2300/083
USPC ........... 280/80.1, 124.111, 124.157, 124.116, 280/86.5, 6.154–6.156; 28/80.1, 124.111, 28/124.157, 124.116, 86.5, 6.154–6.156
See application file for complete search history.

(56) References Cited

U.S. PATENT DOCUMENTS

| | | | | |
|---|---|---|---|---|
| 5,230,528 | A * | 7/1993 | Van Raden et al. | 280/86.5 |
| 5,538,266 | A * | 7/1996 | Martin et al. | 280/6.154 |
| 5,709,394 | A * | 1/1998 | Martin et al. | 280/6.154 |
| 6,073,946 | A * | 6/2000 | Richardson | 280/86.5 |
| 7,201,530 | B2 * | 4/2007 | Wappes et al. | 403/27 |
| 7,234,713 | B1 * | 6/2007 | Vander Kooi et al. | 280/124.106 |
| 7,588,260 | B2 * | 9/2009 | Lopez et al. | 280/124.128 |
| 2001/0052684 | A1 * | 12/2001 | Krone et al. | 280/124.112 |
| 2005/0236795 | A1 * | 10/2005 | Schreiber | 280/124.116 |
| 2006/0249922 | A1 * | 11/2006 | Hinz | 280/124.116 |
| 2010/0007110 | A1 * | 1/2010 | Lie | 280/124.111 |
| 2012/0298431 | A1 * | 11/2012 | Husson et al. | 180/14.4 |
| 2013/0049316 | A1 * | 2/2013 | Schwinn et al. | 280/86.5 |

FOREIGN PATENT DOCUMENTS

FR    2229343   A1 *   12/1974

* cited by examiner

*Primary Examiner* — Ruth Ilan

(57) ABSTRACT

A combine harvester has a suspension axle assembly supporting the rear end of the chassis of the harvester. Side frames of the chassis direct loading down to a transverse axle through a pair of suspension devices interposed between the side frames and the axle. The suspension devices are resilient and expandable to cushion the chassis and to provide changes in the fore-and-aft attitude of the combine. The suspension devices may be independently operated to tilt the axle relative to the chassis, and provision is made for shifting the axle longitudinally, side-to-side of the chassis to facilitate turning of the steerable rear ground wheels.

11 Claims, 7 Drawing Sheets

Fig. 5.

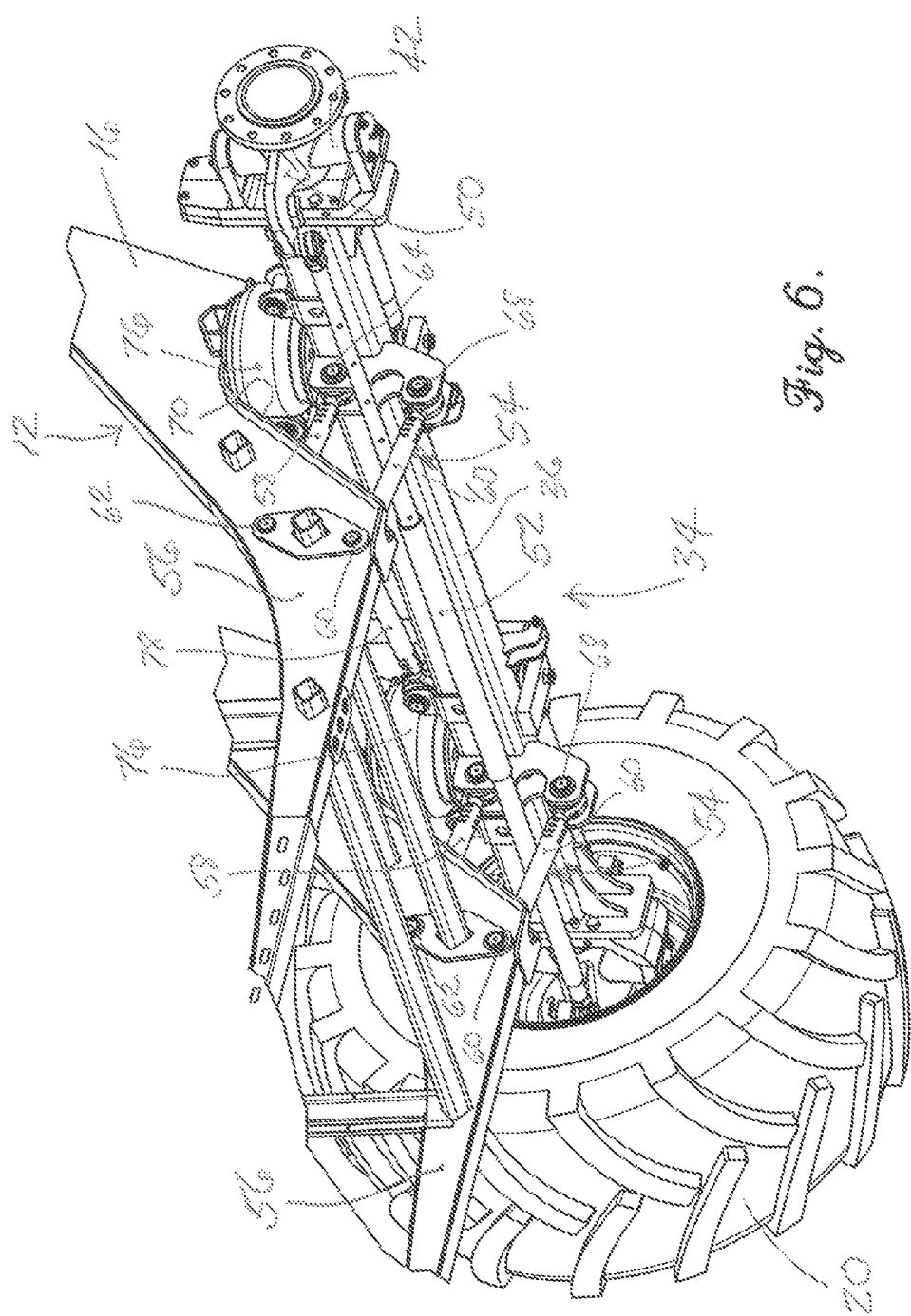

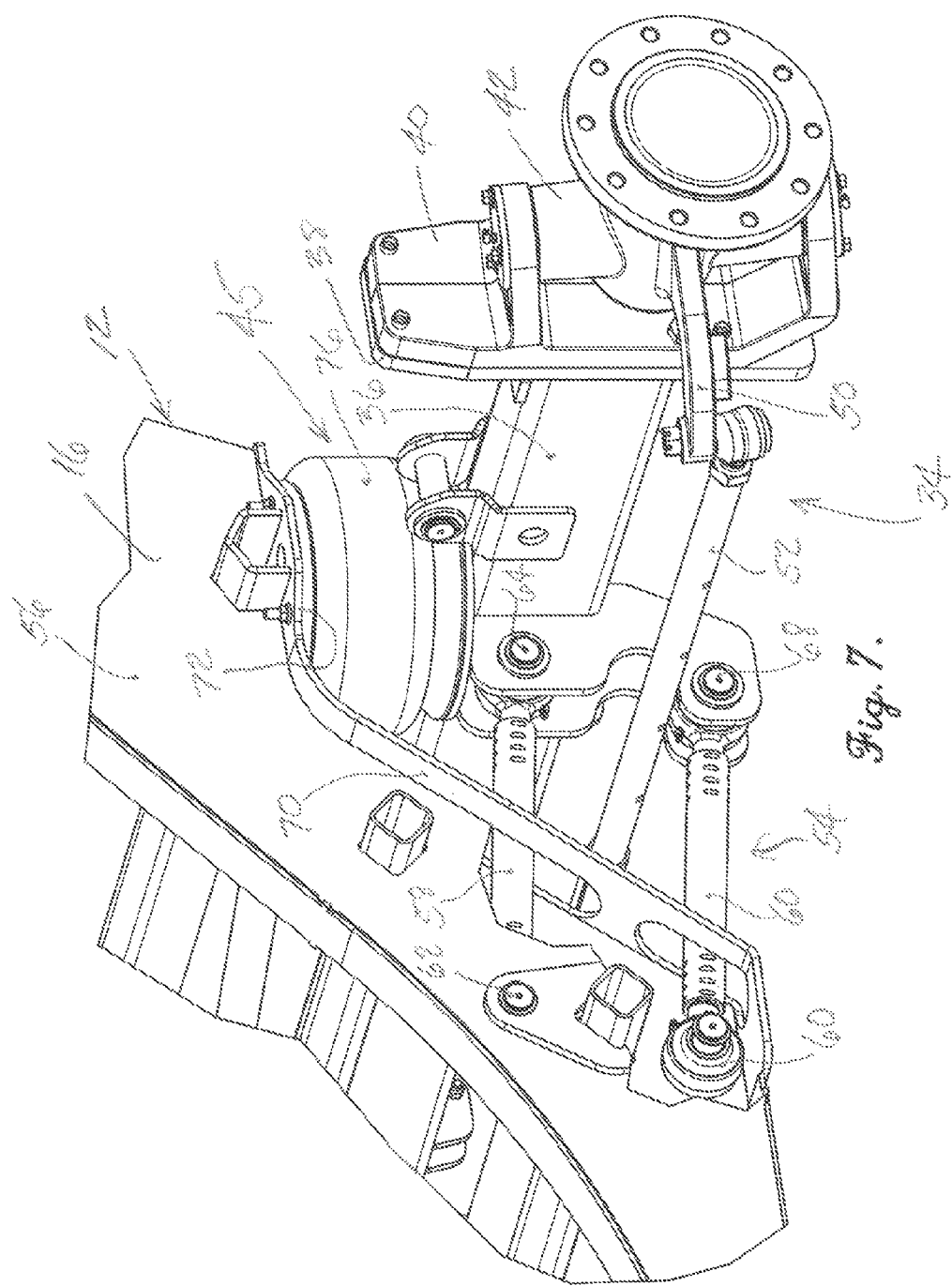

HARVESTER WITH SUSPENDED REAR AXLE

TECHNICAL FIELD

The present invention relates to the field of crop harvesting machines and, more particularly, to a combine harvester having a suspended rear axle.

BACKGROUND AND SUMMARY

As combines have increased in size and weight over the years, considerable structure has been added to the rear axle to support the added loading. Conventionally, combines have utilized a rear axle that has a central, fore-and-aft pivot so the axle can tilt from side-to-side relative to the chassis as changes in ground contour are encountered. In large combines, such a center pivot requires the presence of massive support structure from side frames of the chassis to the center pivot, plus a reinforced axle beam to return the loading out to the ground wheels at opposite ends of the axle. Thus, providing a center pivot rear axle on large, heavy combines gives rise to a number of significant issues.

The present invention provides a combine harvester that achieves the desired center pivot capability for the rear axle without the attendant massive support structure heretofore required in conventional machines. In this regard, the present invention provides a rear axle that is suspended from the chassis such that it not only affords the desired center pivot ability without massive support structure, but also provides reduced shock loading on the chassis, the ability to adjust the fore-and-aft attitude of the combine either manually or automatically, and the ability to achieve enhanced steering of the rear wheels. In a preferred form of the invention, the rear axle of the combine comprises a suspension axle assembly that includes a transverse axle swingably mounted to the chassis for up-and-down movement relative thereto. Suspension apparatus in the form of expandable resilient devices, hydraulically or pneumatically operated, is disposed between the axle and side frames of the chassis to cushion the load and to provide a means for transferring such load to the axle adjacent the ground wheels. The expandable devices can be expanded independently of one another to permit tilting of the axle from side-to-side, or they can be expanded in unison for controlling the fore-and-aft attitude of the machine. In one embodiment of the invention, the suspended axle can be shifted to a certain extent longitudinally, i.e., side-to-side of the combine, to enhance steering.

BRIEF DESCRIPTION OF THE DRAWINGS

Figure 5:
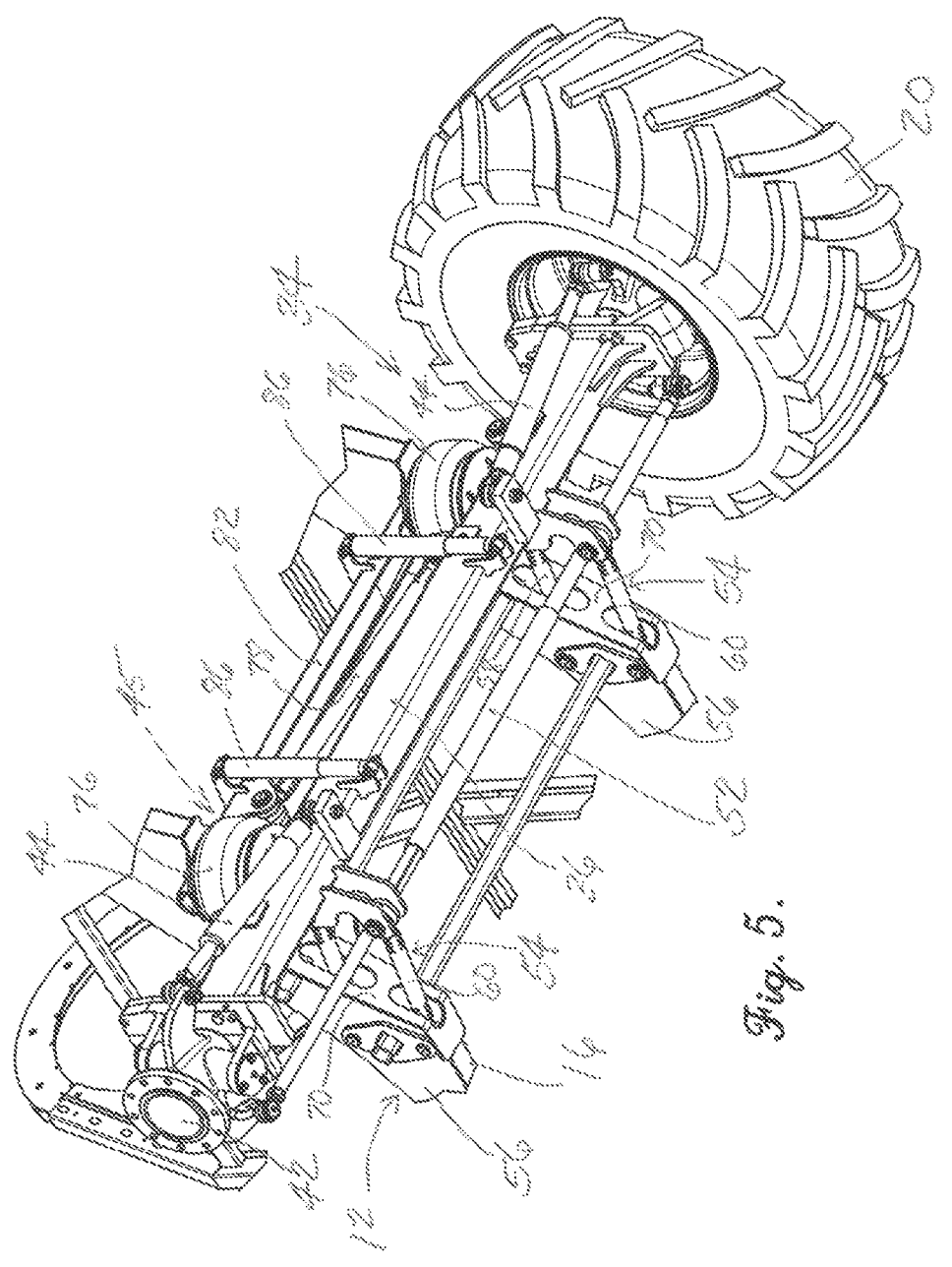

FIG. 5 is an enlarged, fragmentary, left, rear, bottom isometric view of the chassis and suspended rear axle assembly;

FIG. 6 is an enlarged, fragmentary, left, front, bottom isometric view of the chassis and suspended rear axle assembly; and FIG. 7 is a further enlarged, fragmentary, left, front isometric view of the chassis and suspended rear axle assembly.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments. Directional references such as "left" and "right" in this specification are given as if the machine were being viewed from the rear looking forwardly.

Figure 1:
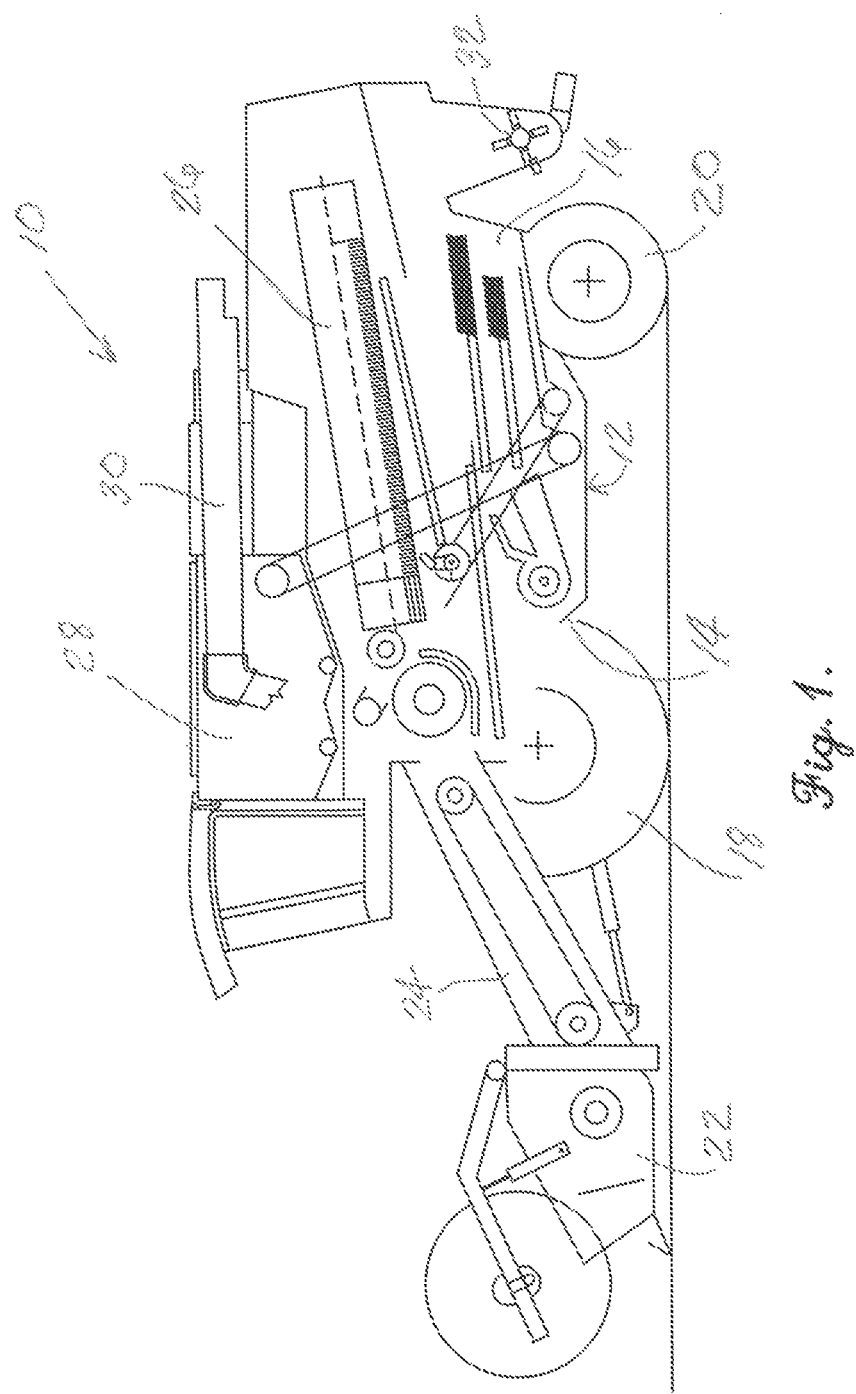
FIG. 1 is a schematic, left side elevational view of a combine that may employ a suspended rear axle in accordance with the principles of the present invention.
Figure 2:
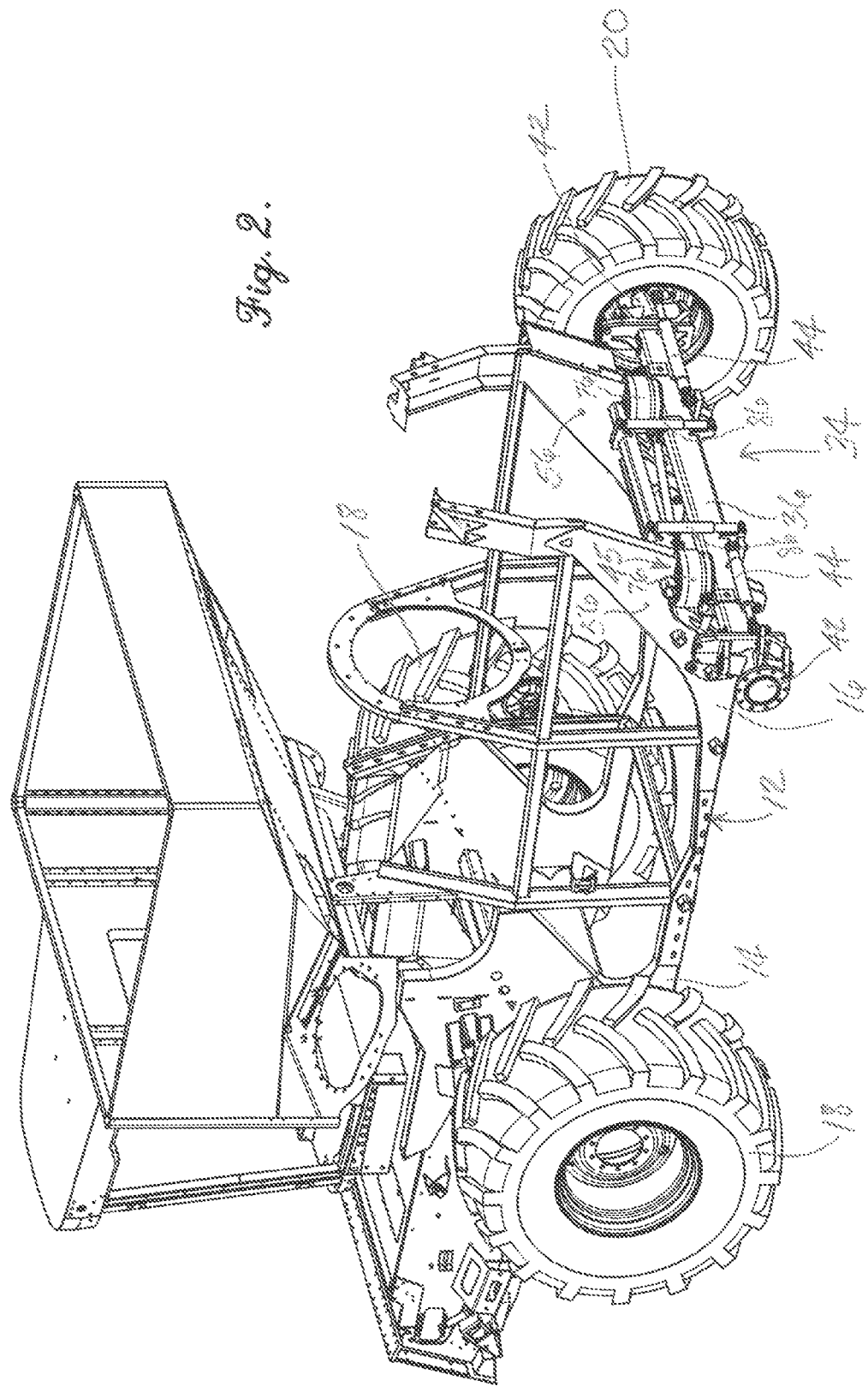
FIG. 2 is a left, rear isometric view of the chassis of the combine and its suspended rear axle assembly, the left ground wheel of the rear axle assembly being removed to reveal details of construction.
Figure 3:
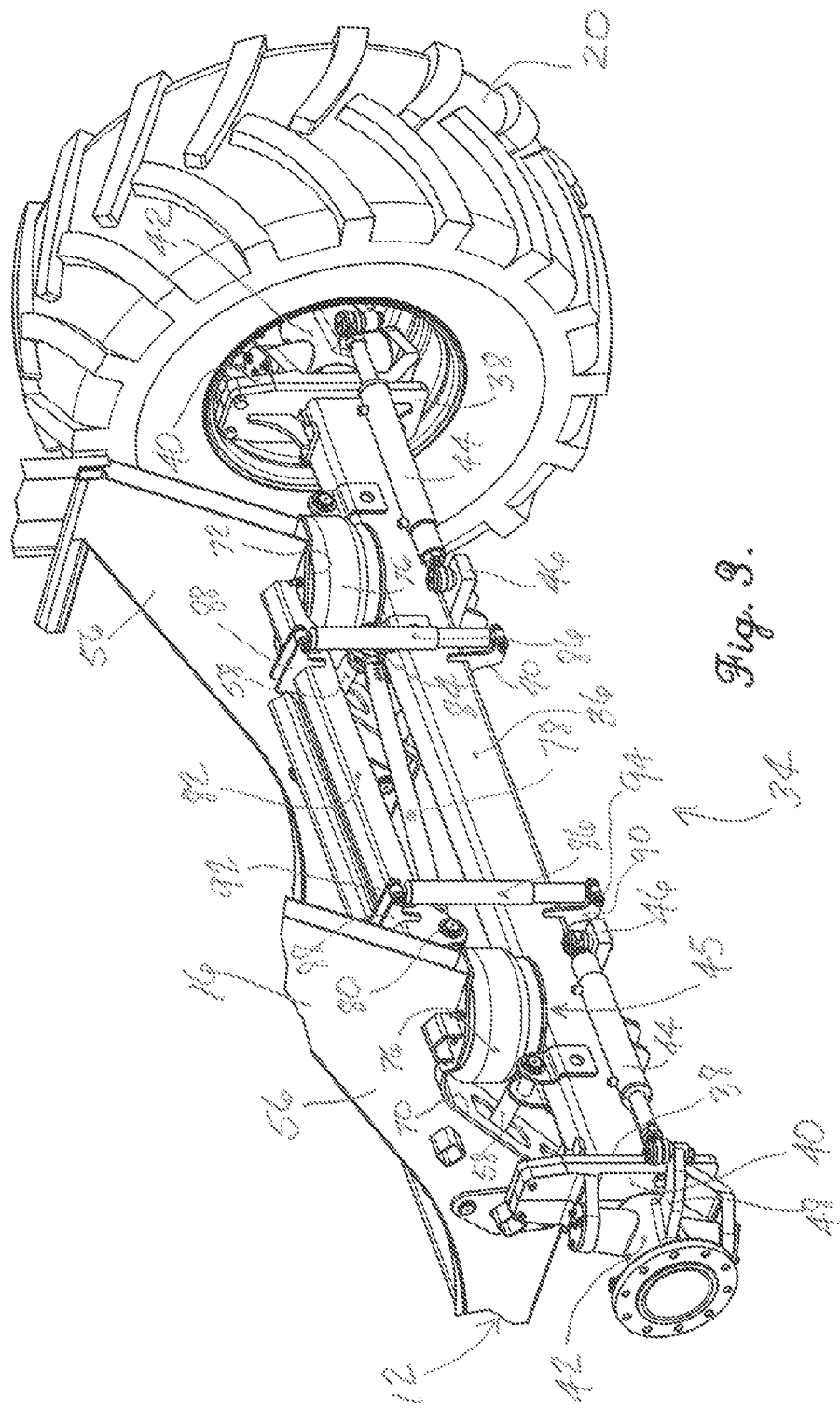
FIG. 3 is an enlarged, fragmentary left, rear isometric view of the chassis and suspended rear axle assembly.
Figure 4:
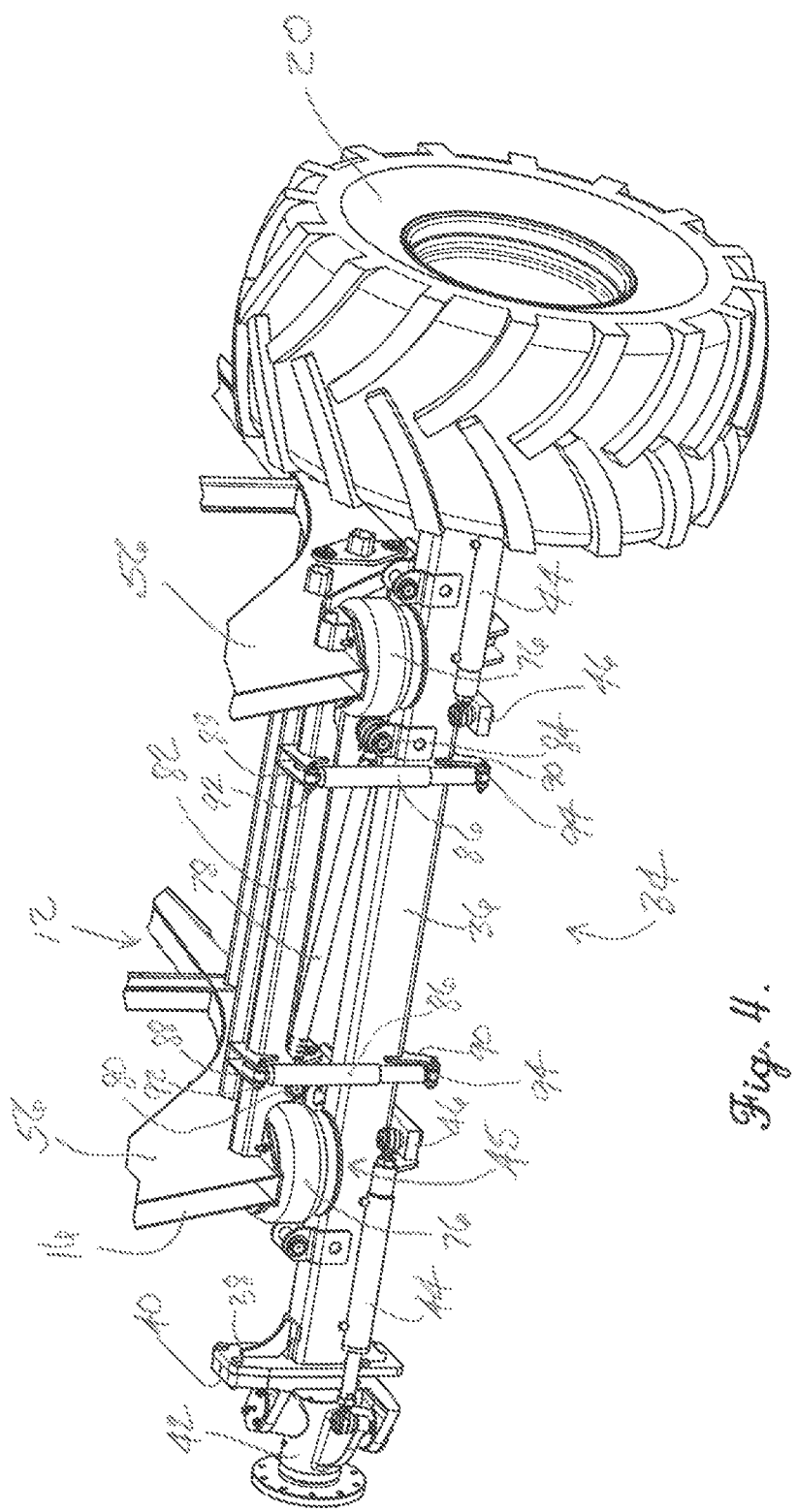
FIG. 4 is an enlarged, fragmentary, right rear isometric view of the chassis and suspended rear axle assembly.

FIG. 1 illustrates a combine harvester 10 that may incorporate a suspended rear axle assembly in accordance with the principles of the present invention. In general terms, combine 10 includes a chassis 12 having a front end 14 and a rear end 16. A pair of front driven wheels 18 (see also FIG. 2) support the front end 14 of chassis 12, while a pair of rear wheels 20 (only one being shown), which may or may not be driven, support the rear end 16 of chassis 12. In the illustrated embodiment, rear wheels 20 are not driven.

Chassis 12 supports at its front end 14 a harvesting header 22 that may take a variety of different forms within the context of the present invention. A feeder house 24 leads harvested crop materials from header 22 rearwardly and upwardly to processing mechanism broadly denoted by the numeral 26 and carried by chassis 12. Grain that has been threshed and cleaned by mechanism 26 is stored in an onboard grain tank 28 and then periodically off-loaded via an unloading spout 30, while trash and other residue from the processing operation is discharged from the rear of combine 10 and scattered by a rotor 32.

Referring particularly to FIGS. 2-7, rear wheels 20 comprise part of a suspension axle assembly broadly denoted by the numeral 34. Wheels 20 are mounted on opposite ends of a transverse axle 36 which also comprises part of suspension axle assembly 34 and, in a preferred embodiment, comprises a tubular, rectangular beam. A pair of upright, inboard flange plates 38 are fixed as by welding to opposite ends of axle 36 and are, in turn, bolted to a pair of corresponding outboard flange plates 40. Each outboard flange plate 40 supports a wheel mount 42 for swiveling movement about a generally upright axis, with each mount 42, in turn, being fastened to a corresponding rear wheel 20 so that each rear wheel 20 is pivotal for steering purposes about the generally upright axis of the corresponding mount 42. The swivelling axis of each mount 42 is slightly inclined upwardly and inwardly so that wheels 20 are slightly inclined inwardly at the top. Each wheel 20 is steered by its own double-acting hydraulic cylinder 44 that is operably connected between a rearwardly projecting lug 46 on axle 36 and a rearwardly projecting crank arm 48 on mount 42. A second pair of crank arms 50 project forwardly from wheel mounts 42 on the front side thereof (FIGS. 6, 7) and are interconnected by a long link or tie rod 52 to ensure that wheels 20 swivel in unison and in synchronism with one another during steering.

Suspension axle assembly 34 further includes suspension apparatus 45 disposed between axle 36 and the rear end 16 of chassis 12 for transferring the load of the rear end of the chassis to axle 36 and ground wheels 20. Among other things, suspension apparatus 45 includes structure for vertically swingably attaching axle 36 to chassis 12. Such swingable mounting structure includes a pair of four-bar linkages 54 at two spaced locations along the length of axle 36. Such two locations correspond to the locations of a pair of upright, left and right side frames 56 that form parts of chassis 12. As illustrated best in FIG. 7, each linkage 54 includes a fore-and-aft top link 58 and a fore-and-aft bottom link 60 that is the same length as top link 58. Links 58, 60 comprise parallel links so that axle 36 swings up and down relative to chassis 12 without changing its attitude. Top link 58 is connected to side frame 56 by a front pivot 62 and to the axle 36 by a rear pivot 64, while bottom link 60 is connected to side frame 56 below top pivot 62 by a lower front pivot 66 and to axle 36 by a lower rear pivot 68. Preferably, all of the pivots 62, 64, 66 and 68 comprise ball joints that permit a limited amount of axial shifting of axle 32 as well as a limited amount of skewing and tilting thereof in a variety of directions.

The bottom edge of each side frame 56 is notched or cut out at the lower rear corner thereof to provide space for the up-and-down movement of axle 36. Each side frame 56 thus presents an upwardly and rearwardly inclined notch edge 70 in front of axle 36 and a generally horizontal, rearwardly extending notch edge 72 overlying and spaced above axle 36.

Suspension apparatus 45 further comprises a pair of suspension devices 76 between the horizontal notch edges 72 and axle 36. Each suspension device 76 comprises an expandable device that could be pneumatic or hydraulic in nature. In either case, suspension devices 76 provide resilient, load-bearing support for chassis 10 and can be expanded or retracted to change the spacing between horizontal edges 72 of side frames 56 and axle 36 as may be necessary or desirable. Preferably, each device 76 is operable independently of the other, although they both may be operated in unison. In this manner, if suspension devices 76 are operated in unison, axle 36 is raised and lowered relative to chassis 12 in a horizontal condition, while if one of the devices 76 is operated to a greater or lesser extent than the other, one end of axle 36 will be tilted relative to the other end. Preferably, the top and bottom ends of devices 76 are fastened securely to their respective chassis and axle structures, but the nature of devices 76 and their fastening means may be such as to permit axle 36 to be shifted to a limited extent in a longitudinal direction, i.e., side-to-side of the combine 10.

Suspension apparatus 45 further includes a stabilizing link 78 along the top side of axle 36 located generally between suspension devices 76. Stabilizing link 78 has a pivotal, ball-joint connection 80 at one end with a chassis cross bar 82 that spans side frames 56, and a pivotal, ball-joint connection 84 at its opposite end with axle 36. In one preferred embodiment, stabilizing link 78 is non-extendable so as to prevent side-to-side shifting of axle 36 relative to chassis 12. However, in another preferred embodiment, stabilizing link 78 may be extendable and retractable, such as in the nature of a hydraulic piston and cylinder assembly. In this way, the hydraulic version of the stabilizing link 78 can preclude side-to-side shifting of axle 36 when the cylinder assembly is maintained at a certain length, but can also cause side-to-side displacement of axle 36 when extended or retracted to enhance and facilitate steering. Such displacement of axle 36 may be beneficial in providing additional clearance between a particular one of the ground wheels 20 and chassis 12, depending upon the direction of turning, the size of the wheels 20, and other factors. The hydraulic version of stabilizing link 78 may be coupled with suitable control mechanism for automatically causing appropriate shifting of axle 36 during steering operations, if desired. The various ball-joint connections between suspension assembly 34 and chassis 12 are capable of allowing a limited amount of side-to-side displacement of axle 36.

Suspension apparatus 45 additionally includes a pair of upright shock absorbers 86 adjacent to and slightly inboard of suspension devices 76. Each shock absorber 86 is pivotally connected at its upper end to a mounting lug 88 projecting rearwardly from cross bar 82 and is pivotally connected at its lower end to a mounting lug 90 projecting downwardly and rearwardly from the bottom side of axle 36. The pivotal connection 92 at the upper lug 88 and the pivotal connection 94 at bottom lug 90 are preferably both ball-joint pivot connections.

It should be apparent from the foregoing that suspension axle assembly 34 supports the load of the rear of combine 10 in an effective manner without massive, heavy reinforcing structure. Chassis side frames 56 transmit the load through suspension devices 76 directly down to axle 36 at locations fairly close to ground wheels 20, whereupon the load is directed a short distance outwardly to wheels 20 and down to the ground. Center-pivoting of axle 36 is still achievable by virtue of the independent nature of the two suspension devices 76 such that axle 36 is free to tilt about a central fore-and-aft axis, or can be intentionally tilted by expanding or retracting one of the suspension devices 76 relative to the other. Shock loading to the rear of the combine because of sudden changes in terrain is prevented by the resilient nature of suspension devices 76 and the shock absorbers 86. Steering of wheels 20 is in no way compromised and, in fact, can be enhanced by making axle 36 intentionally shiftable side-to-side as explained above.

The inventor(s) hereby state(s) his/their intent to rely on the Doctrine of Equivalents to determine and assess the reasonably fair scope of his/their invention as pertains to any apparatus not materially departing from but outside the literal scope of the invention as set forth in the following claims.

The invention claimed is:

1. A combine harvester comprising:
    a chassis having a front end and a rear end;
    a harvesting header attached to said front end of the chassis;
    processing mechanism mounted on the chassis for processing crop materials harvested by said header;
    a pair of driven front wheels supporting said front end of the chassis behind the header; and
    a suspension axle assembly supporting said rear end of the chassis and including:
        a transverse axle vertically swingably attached to said chassis;
        a pair of ground wheels rotatably mounted at opposite ends of said axle; and
        suspension apparatus between said axle and said rear end of the chassis for transferring the load of the rear end of the chassis to said axle and the ground wheels, wherein said suspension apparatus includes a pair of inflatable devices at spaced locations along the length of said axle, said devices being inflatable independently of one another for tilting said axle relative to said chassis.

2. A combine harvester as claimed in claim 1, said suspension apparatus further including at least one shock absorber connected between said axle and the chassis.

3. A combine harvester as claimed in claim 2, said suspension apparatus including a pair of shock absorbers located between said suspension devices and connected between said axle and the chassis.

4. A combine as claimed in claim 1, said axle being connected to said chassis by a pair of link assemblies disposed at spaced locations along the length of said axle.

5. A combine harvester as claimed in claim 4, each of said link assemblies comprising a four-bar linkage.

6. A combine harvester as claimed in claim 5, said four-bar linkage including a pair of parallel links.

7. A combine harvester as claimed in claim 1, each of said ground wheels being mounted on said axle for adjustable pivoting movement about a generally upright axis, said suspension axle assembly further comprising a pair of remotely actuatable linear actuators operably connected between said axle and respective ones of said ground wheels for steering the ground wheels.

8. A combine harvester as claimed in claim 1, said suspension apparatus further comprising a stabilizing link connected between said axle and said chassis in a manner to control lengthwise displacement of the axle relative to the chassis.

9. A combine harvester as claimed in claim 8, said stabilizing link being extendable for permitting adjustable lengthwise displacement of the axle relative to the chassis.

10. A combine harvester as claimed in claim 1, said suspension apparatus further including at least one shock absorber connected between said axle and the chassis.

11. A combine harvester as claimed in claim 10, said suspension apparatus including a pair of shock absorbers located between said suspension devices and connected between said axle and the chassis.

\* \* \* \* \*